Patented Dec. 28, 1948

2,457,111

UNITED STATES PATENT OFFICE 2,457,111

SUCCINIC ESTER SYNTHESIS

William F. Gresham, Wilmington, Del., assignor to E. I. du Pont de Nemours & Company, Wilmington, Del., a corporation of Delaware No Drawing. Application March 28, 1947, Serial No. 738,007

7 Claims. (Cl. 260—485)

This invention relates to the synthesis of succinic acid and diesters thereof. More particularly the invention is concerned with a novel process for the synthesis of diesters of succinic acid by reaction between carbon monoxide and esters of beta-alkoxypropionic acids in accordance with the following equation:

$$ROCH_2CH_2COOR' + CO \rightarrow ROCOCH_2CH_2COOR'$$

wherein R and R' are alkyl groups, preferably alkyl groups containing from 1 to 4 carbon atoms.

Heretofore it was known that aliphatic esters could be prepared by reaction between dialkyl ethers and carbon monoxide at elevated temperatures and pressures in the presence of catalysts such as boron trifluoride (U. S. 2,135,449). In general, however, it has not been possible to carry out a corresponding synthesis of esters from ethers containing substituent groups, especially those having relatively high molecular weights, because the reaction conditions which are required for the introduction of carbon monoxide are such that the substituted ethers are decomposed thereby, so that reaction products other than the desired esters are generally obtained. For example, it has been observed that at temperatures as low as about 100° C., and even lower, the methyl ester of beta-methoxypropionic acid decomposes in the presence of boron trifluoride to yield methanol and methyl acrylate in accordance with the following equation:

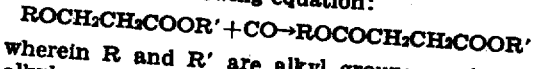

Moreover, at a temperature of about 100° to 105° under a carbon monoxide pressure of about 800 atmospheres, the methyl ester of beta-methoxypropionic acid is very rapidly decomposed in the presence of boron trifluoride (50% decomposition in 30 minutes) and virtually no dimethyl succinate is produced.

An object of this invention is to provide a process for the synthesis of succinic acid and esters thereof from lower molecular weight compounds. Another object of the invention is to provide a process for the introduction of carbon monoxide into esters of beta-alkoxypropionic acid without excessive decomposition of the said acid esters of beta-alkoxypropionic acid. Other objects of the invention will appear hereinafter.

The objects of the invention are accomplished by heating a beta-alkoxy ester of the formula ROCH$_2$CH$_2$COOR', R and R' being alkyl groups preferably containing from 1 to 4 carbon atoms, with carbon monoxide at a temperature within the range of about 125° to 300° C., preferably about 190° to 220° C. under a pressure of at least about 300 atmospheres, or higher, preferably about 500 to 1500 atmospheres, in the presence of a catalyst to be hereinafter described. It is essential in the practice of the invention that prolonged heating periods at relatively low temperatures, e. g. below 125° C., to be avoided if high yields of the desired dialkyl succinates are to be obtained by reaction between carbon monoxide and beta-alkoxypropionic esters in the presence of the said catalysts. One way of avoiding the decomposition of the beta-alkoxypropionic esters is to heat the mixture of beta-alkoxypropionic ester, carbon monoxide and catalyst to a reaction temperature above about 125° very rapidly, e. g. during a period of not more than about 15 to 20 minutes. An alternative method is to heat the beta-alkoxypropionic ester and the carbon monoxide to a temperature of at least about 125° prior to introduction of the catalyst. In the latter embodiment the catalyst may be introduced in the form of a mixture with an additional quantity of the beta-alkoxypropionic ester, or it may be introduced in substantially pure form. In general, it is desirable to avoid any heating of the reaction mixture at a temperature of about 50° to 125° C. for periods of time longer than about 10 minutes, if optimum results are to be obtained.

The catalysts which may be employed in the practice of the invention include boron trifluoride, sulfuric acid, and pyrophosphoric acid of the formula H$_4$P$_2$O$_7$. In general, other acidic catalysts have been found to give relatively poor results. For example, hydrogen fluoride, hydrogen chloride, trifluoroacetic acid, toluenesulfonic acid and zinc chloride have been found to be relatively poor catalysts for the synthesis of succinic acid esters in accordance with the present invention. In general, the BF$_3$, H$_2$SO$_4$, and H$_4$P$_2$O$_7$ catalysts which are most effective as catalysts in the practice of the invention preferably should be employed in substantially anhydrous form. A suitable pyrophosphoric acid catalyst can be prepared by admixing 85% phosphoric acid with a sufficient quantity of P$_2$O$_5$ to produce a mixture having the empirical formula H$_4$P$_2$O$_7$, which mixture yields the desired pyrophosphoric acid under the reaction conditions.

Optimum yields of dialkyl succinates are obtained in the practice of the invention by the use of anhydrous BF$_3$ as the catalyst. In order to obtain highest yields it is essential to control the initial mol ratio of BF$_3$:beta-methoxypropionic ester so that it is within the range of about 0.8 to 1.3. Other mol ratios of $BF_3$:beta-alkoxypropionic ester may be employed but the yields are considerably higher when the mol ratio is within the above-mentioned preferred range.

Any suitable method may be employed for the recovery of dialkyl succinates from the reaction product obtained in accordance with the present invention. For example, the acidic catalyst may be destroyed by reaction with sodium methylate dissolved in methanol, and the dialkyl succinate can thereafter be distilled without decomposition from the resulting mixture. When the $BF_3$ catalyst is employed it may be removed from the reaction product by treatment with an alkali metal or alkaline earth metal fluoride, which reacts therewith to form an alkali metal or alkaline earth metal fluoroborate. Any other convenient method for destroying or removing the boron trifluoride catalyst may be employed.

The invention is illustrated further by means of the following examples.

*Example 1.*—Methyl beta-methoxypropionate was charged into a shaker tube with boron trifluoride, and carbon monoxide was injected under high pressure. The reaction conditions, and conversion to dimethyl succinate, are set forth in the following tables.

*Effect of $BF_3$:Methyl-beta-methoxypropionate ratio in shaker tube experiments leading to dimethyl succinate*

| Run | Temperature | Time | CO Pressure (atm.) | $BF_3$:ester ratio | Conversion to Dimethyl Succinate |
|---|---|---|---|---|---|
| | °C. | Min. | | | Per cent |
| 1a | 200–215 | 30 | 450–800 | 0.81 | 21 |
| 1b | 200–230 | 30 | 440–800 | 1.00 | 60 |
| 1c | 200–205 | 15 | 855–850 | 1.08 | 42 |
| 1d | 200 | 30 | 405–800 | 1.08 | 60 |
| 1e | 210–240 | 30 | 55–800 | 1.51 | ca. 15 |

*Effect of temperature on the synthesis of dimethyl succinate from carbon monoxide, methyl-beta-methoxypropionate, and $BF_3$*

| Run | Temperature | Time | CO pressure (atm.) | $BF_3$:ester ratio | Conversion to Dimethyl Succinate |
|---|---|---|---|---|---|
| | °C. | Min. | | | |
| 2a | 100–105 | 30 | 800–790 | 1.5 | 0 (methyl acrylate was formed). |
| 2b | 200 | 30 | 405–800 | 1.08 | 60%. |
| 2c | 237–255 | 20 | 580–800 | 1.1 | Low. |

*Example 2.*—A charge consisting of 98 grams of concentrated sulfuric acid and 118 grams of methyl beta-methoxypropionate $$CH_3OCH_2CH_2COOCH_3$$

was processed in a 325 cc. silver-lined shaker tube at 250° to 272° C. for 1 hour at 640 to 800 atmospheres pressure of carbon monoxide. The pressure drop was 230 atmospheres. The discharged liquid was made basic with sodium methylate in methanol and distilled. After the removal of methanol, there was obtained 15.1 grams of liquid boiling in the range of dimethyl succinate. This corresponds to a conversion of ca. 10%, based on methyl beta-methoxypropionate.

*Example 3.*—A charge consisting of 70.2 grams of 85% orthophosphoric and 41.6 grams phosphoric anhydride (corresponding to 0.63 M  $H_4P_2O_7$) and 114 grams of methyl beta-methoxypropionate was processed in a silver-lined shaker tube at 275° to 280° for 1 hour at 595 to 700 atmospheres carbon monoxide pressure. The product was made basic with a solution of sodium methylate in methanol and distilled, giving 18.8 grams of a mixture boiling from 30 to 70° at 1 mm. The resulting product contained dimethyl succinate (ca. 10 to 15% conversion).

The dialkyl succinates obtained as above described can be converted to succinic acid by acid hydrolysis. Moreover, they are widely useful per se and as intermediates in the manufacture of glycols, diamides, dinitriles, and the like.

It is to be understood that the above examples are illustrative only and they do not limit the invention in any way. Since many modifications of the invention will occur to those who are skilled in the art, it is to be understood that I do not limit myself except as set forth in the following claims.

I claim:

1. A process for the synthesis of esters of succinic acid which comprises heating a beta-alkoxypropionic ester of the formula $ROCH_2CH_2COOR'$, R and R' being alkyl groups containing from 1 to 4 carbon atoms, with carbon monoxide at a temperature within the range of 125° to 300° C. in the presence of a catalyst of the class consisting of $BF_3$, $H_2SO_4$, and $H_4P_2O_7$, under a pressure of at least about 300 atmospheres whereby a dialkyl succinate of the formula $ROCOCH_2CH_2COOR'$ is produced, and recovering the said dialkyl succinate from the resultant reaction mixture.

2. A process for the synthesis of esters of succinic acid which comprises heating the methyl ester of beta-methoxypropionic acid with carbon monoxide at a temperature within the range of about 125° to 300° C. in the presence of a catalyst of the class consisting of $BF_3$, $H_2SO_4$ and $H_4P_2O_7$, under a pressure within the range of about 500 to 1500 atmospheres, and recovering dimethyl succinate from the resultant reaction product.

3. A process for the synthesis of esters of succinic acid which comprises heating the methyl ester of beta-methoxypropionic acid with carbon monoxide at a temperature within the range of about 190° to 220° C. in the presence of a catalyst of the class consisting of $BF_3$, $H_2SO_4$ and $H_4P_2O_7$, under a pressure within the range of about 500 to 1500 atmospheres, and recovering dimethyl succinate from the resultant reaction product.

4. A process for the synthesis of esters of succinic acid which comprises heating the methyl ester of beta-methoxypropionic acid with carbon monoxide to a temperature within the range of 125° to 300° C. in the presence of boron trifluoride, the said heating being sufficiently rapid so that the reaction mixture is at a temperature between room temperature and 125° C. for a period of time not in excess of 20 minutes, thereafter continuing the heating at a temperature within the range of 125° to 300° C. whereby dimethyl succinate is produced, and thereafter separating the said dimethyl succinate from the resulting reaction mixture.

5. A process for the synthesis of esters of succinic acid which comprises heating a mixture consisting of carbon monoxide and the methyl ester of beta-methoxypropionic acid to a temperature of about 125° to 300° C., introducing an acid catalyst of the class consisting of $BF_3$, $H_2SO_4$, and $H_4P_2O_7$ into the said mixture at the said temperature, maintaining the resulting mixture at a temperature of about 125° to 300° C. until a substantial quantity of dimethyl succinate is formed, and thereafter separating the said dimethyl succinate from the resulting reaction mixture.

6. A process for the synthesis of esters of succinic acid which comprises heating a mixture consisting of carbon monoxide and the methyl ester of beta-methoxypropionic acid to a temperature of about 125° to 300° C., introducing an acid catalyst of the class consisting of $BF_3$, $H_2SO_4$, and $H_4P_2O_7$ into the said mixture at the said temperature, maintaining the resulting mixture at a temperature of about 190° to 220° C. until a substantial quantity of dimethyl succinate is formed, and thereafter separating the said dimethyl succinate from the resulting reaction mixture.

7. A process for the synthesis of dimethyl succinate which comprises heating a mixture consisting essentially of carbon monoxide, $BF_3$, and the methyl ester of beta-methoxypropionic acid, the mol ratio of $BF_3$:methyl ester of beta-methoxypropionic acid being initially from 0.8 to 1.3, at a temperature within the range of 125° to 300° C. without subjecting the said mixture to a temperature of about 50° to 125° for any period of time in excess of about 10 minutes, continuing the said heating at 125° to 300° C. until a substantial quantity of dimethyl succinate is formed, and thereafter separating the said dimethyl succinate from the resulting reaction mixture.

WILLIAM F. GRESHAM.

REFERENCES CITED

The following references are of record in the file of this patent:

UNITED STATES PATENTS

| Number | Name | Date |
|---|---|---|
| 2,135,449 | Loder | Nov. 1, 1938 |
| 2,135,450 | Larson | Nov. 1, 1938 |